Dec. 5, 1950 L. GREENE Re. 23,302

STALL WARNING DEVICE FOR AIRPLANES

Original Filed May 12, 1944 2 Sheets-Sheet 1

INVENTOR.
LEONARD GREENE
BY Percy Freeman
ATTORNEY.

STALL WARNING DEVICE FOR AIRPLANES

Original Filed May 12, 1944 2 Sheets-Sheet 2

INVENTOR.
LEONARD GREENE.
BY Percy Freeman
ATTORNEY.

Reissued Dec. 5, 1950

Re. 23,302

BEST AVAILABLE COPY

UNITED STATES PATENT OFFICE 23,302

STALL WARNING DEVICE FOR AIRPLANES

Leonard Greene, Scarsdale, N. Y.

Original No. 2,478,967, dated August 16, 1949, Serial No. 535,265, May 12, 1944. Application for reissue December 31, 1949, Serial No. 136,341

3 Claims. (Cl. 177—311)

Matter enclosed in heavy brackets [ ] appears in the original patent but forms no part of this reissue specification; matter printed in italics indicates the additions made by reissue This invention relates to airplanes and more particularly to means for indicating the angle of attack during flight, for the purpose of warning of the approach of a stall.

The forces to which an airplane is subjected consist of gravity, acceleration, thrust, drag, and lift. The ability of the wings to maintain the airplane in flight other than in a stalled condition, is measured by the lift which that wing is capable of producing. The lift of a wing must equal the forces exerted on it at all times. This lift can be expressed in a formula wherein the lift is equal to the wing area multiplied by the coefficient of lift, a constant, the density of the air, and the square of the velocity.

In the formula. $L=Ac_1 (kD) V^2$, L is the lift, A the area of the wing surface, $c_1$ is a coefficient of lift, k is a numerical constant, D is the density of the air, V is the velocity of the airplane. In this equation, the area of the wing is known or may readily be determined. The density of the air in which the plane is flown, the velocity at which it is flown, and the vertical forces or lift which are imposed upon the wing, all are conditions which the pilot of the airplane determines during flight. It is the coefficient of lift in the above formula which varies so as to maintain the relationship expressed by the formula. If this coefficient of lift were capable of varying without limit, then any conditions of flight would be met by a corresponding variation in the value of $c_1$. This is not so, however, as the coefficient of lift has a maximum value which is predetermined by the design of the wing.

The coefficient of lift will vary solely with the angle of attack of the wing. In defining angle of attack, we may say that this angle is the angle formed by the chord of the wing and the direction of the air through which it moves. This variation of the coefficient of lift with the angle of attack can be predetermined by means of tests. For any wing section, there is an angle of attack which creates the maximum coefficient of lift. If this angle of attack is exceeded, the coefficient of lift will decrease, and the airplane will stall. This angle of attack which creates a maximum coefficient of lift is called the stalling angle of attack and its value is known or can be determined for any airplane.

The present invention contemplates the provision of a device for indicating an angle of attack equal to the above stated critical value. The invention also contemplates indication of an angle of attack slightly less than said critical value to give warning in advance of an impending stall so that rectification of the condition which is creating the stalling angle of attack, may be made.

The advantages of an indicating device for this purpose should be apparent when it is pointed out that at the stalling angle of attack, the coefficient of lift of a wing is the maximum for that wing surface. Hence, any further decrease in velocity or increase in load due to acceleration, will exert a force on the wing greater than that which the wing can maintain and yet keep the airplane from becoming uncontrollable. In giving this warning by indicating the approach of the stalling angle of attack, the possibility of obtaining a point where a coefficient of lift is demanded of the wing surface in excess of that which it can supply by virtue of its design, is eliminated.

With the foregoing in mind, the objects, features, and advantages of the invention will become more clearly apparent from the following detailed specification which has basis on the accompanying drawing in which the invention is exemplified.

In the drawings—

When an airfoil is moved through an air mass at an angle which allows the air to flow smoothly over its surfaces, the air is separated by the airfoil into two portions which follow the upper and lower surfaces respectively. This invention takes place in the vicinity of the leading edge of the airfoil. This point where the flow divides is known as the stagnation point and the air immediately above and below it travels in opposite directions away from this point.

Figure 1:
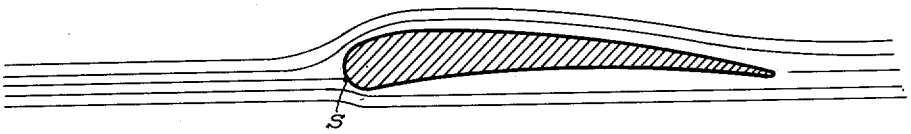
Fig. 1 is a diagrammatic view showing the flow lines about an airfoil which is set at a small angle with respect to the flow direction.
Figure 2:
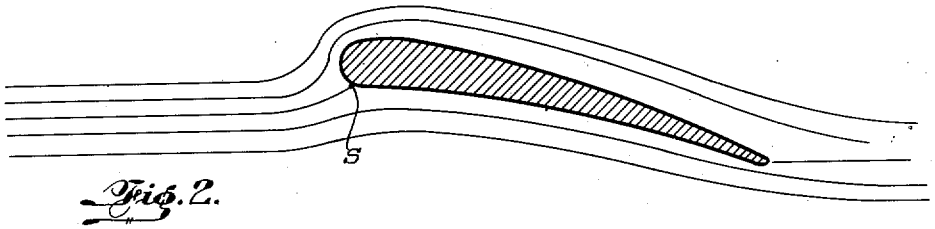
Fig. 2 is a similar view but showing the airfoil at a greater angle with respect to the flow direction.

In Fig. 1 is illustrated diagrammatically the flow lines about an airfoil which is set at a small angle with respect to the flow direction, while in Fig. 2 the flow lines are shown in the position they assume when the angle of attack, or the angle with respect to the flow direction, has been increased. The point marked S is the stagnation point (point where the flow divides) and it is seen that increasing the angle of the airfoil moves this point down and aft along the lower surface of the airfoil.

It is a characteristic of airfoils that the lift increases as the angle of attack is increased but only up to a certain angle of attack. If the airfoil assumes an angle greater than this value, the flow ceases to follow the curved upper surface and what is known as a stall takes place. This stall is accompanied by a loss of lift and constitutes an unsafe flight condition unless the pilot is aware of the condition.

The change in stagnation point position which accompanies change of angle of attack, may be utilized as a means whereby the pilot may be warned of an approaching stall condition. If a small swinging vane or flap be attached to, or adjacent to, the zone of the stagnation point, the changing direction of flow and wind force on the vane, when the airfoil is at an angle of attack near the stall condition, will provide a stall-warning means.

Figure 3:
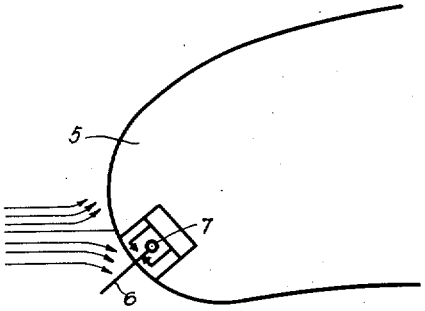
Figs. 3 and 4 are diagrammatic views of an edge of an airplane wing showing the two positions of the device of the invention with respect to the flow direction.
Figure 4:
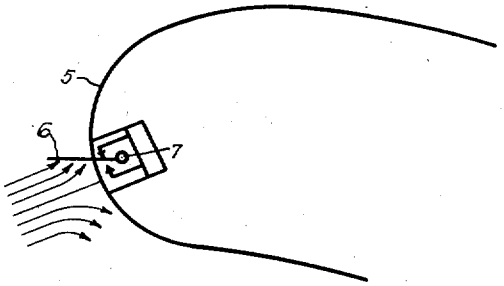

The operation of such a stall-warning mechanism is described as follows: when the angle of attack is low and corresponds to a safe flight condition, the stagnation point is above the vane, as indicated in Fig. 3. In this condition, the air is moving down from the stagnation point and causes a downward force on the vane. This will produce no warning signal. However, if the angle of attack is increased beyond that which is considered safe, the stagnation point will be located below and aft of the vane, and this will cause an upward flow and force the vane upwardly so that it may close an electric circuit and be relayed by signal means to the pilot as a warning of an approaching stall condition.

Measurement of the position of the stagnation point with respect to the leading edge of an airfoil offers a distinct advantage as a stall-warning means. As the stagnation point moves from a position above the vane to a position below it, the complete change in flow direction offers a sensitive and positive stall-warning means. Potential flow theory, whereby flow about an airfoil is treated mathematically through conformal transformation, shows that the location of the stagnation point has a definite relation to the lift of an airfoil. Flight tests have proven that this fact provides a reliable stall-warning means.

The illustrated form of the invention is applied to the leading edge of a wing 5 and comprises a vane or flap 6 pivoted to said wing as at 7. The vane or flap 6 is supported by a bracket 8 so that in normal flight (Fig. 8) an angle $\alpha$ is formed between said flap and an extension of the chord 9 of the wing.

The angle $\alpha$ is of such degree that the flap 6 will remain in supported relation on the bracket 8 until the stalling angle of attack is reached and preferably slightly before this angle is attained. The air mass indicated by the arrows 10 will firmly maintain this condition so long as the pressure of said mass is exerted upon the upper surface of the flap.

Figure 9:
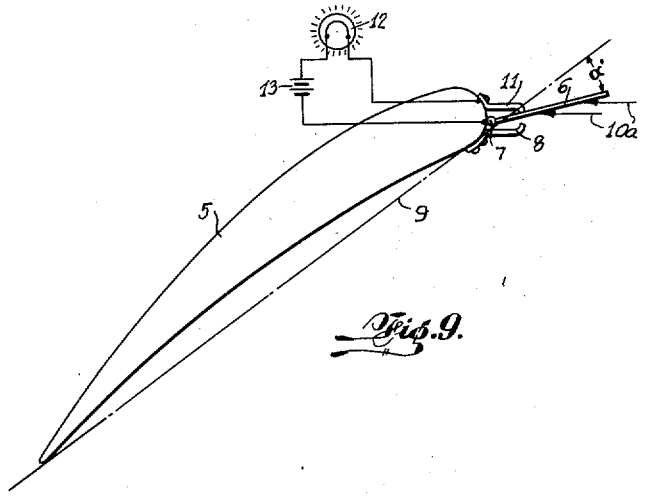
Fig. 9 is a similar view thereof in which the angle of attack is critical.

As the stalling angle of attack is approached, i. e., when the angle of the chord 9 becomes too great with respect to the direction of the air mass, the flap 6, still resting on the bracket 8, is angularly directed so that the air mass, indicated by the arrows 10a of Fig. 9, impinges on the under surface of the flap. The air mass will then lift the flap on its pivot 7 to decrease the angle $\alpha$ to the angle $\alpha^1$ and be brought into engagement with the contact 11 to light the warning lamp 12 arranged in an electric circuit including a power source 13, the flap 6, and the contact 11. This warning light or other visual or audible signaling means may be located in the cock-pit or cabin for observation by the airplane pilot. Upon receiving the warning that the stalling angle of attack is being approached, the pilot may take such action as is necessary to bring the airplane to a safer flying condition. As soon as the angle of the chord 9, with the air mass, is decreased, the flap will again fall upon the bracket 8 to wipe out the signal and thus indicate that the airplane is being safely directed.

The angle $\alpha$ may be arranged in accordance with the degree of safety desired and in accordance with the design and characteristics of the wing to which it is applied.

The angle of attack, as previously defined, is solely the angle made by the wing or air mass vector with the chord of the wing and, therefore, is independent of the attitude or angular disposition of the airplane with respect to the earth. For example, if the chord of the wing were inclined so as to be vertical and at an angle of 90° with respect to the earth, and at the same time, the air passing the wing were in line with the chord, the attitude of the plane would be 90° with respect to the earth, but would be 0° with respect to the air through which it is moving. No signal would be given under these conditions because the wind would be striking the vane on its upper surface and, therefore, would keep it pressed against its supporting bracket. Not giving a warning signal under this condition is desired, as this condition occurs in several acrobatic maneuvers, such as during a loop, Immelman, wingover, etc., and the airplane is not in a stalled condition. On the other hand, if the airplane were pointed downward with respect to the horizon, and at the same time the forces exerted on the wing cause the wing to move to an angle of attack with resepct to the air exceeding the angle at which the vane was supported, the wind would strike the under surface of the vane and lift it to close the contact to the electric warning circuit. This would show a condition exceeding the safety margin despite the fact that the attitude of the airplane is downward. It is desirous to have the device give a warning signal under this condition as this condition occurs during a glide where the pilot attempts to glide too far without a sufficient decrease in altitude, or it occurs when the pilot attempts to raise the nose of the airplane at too low a speed. In these situations the flight of the airplane is close to a dangerous stall or tailspin. These extremes are given to show the independent nature of the angle of attack as compared to the attitude of the airplane.

To demonstrate the critical or unstable equilibrium which exists at the stalling angle of attack, it can be stated that when this angle of attack is exceeded, the coefficient of lift, instead of increasing, will decrease. Therefore, from our original formula, this lift will not be able to cause an equilibrium with the other forces on the airplane, and the airplane will accelerate downwards. This condition is known as a stall, and the loss of altitude created during a stall constitutes a menace to the safety of flight. This stalled condition must occur before the airplane can be capable of entering into a tailspin. The loss of altitude during a stall or a tailspin is dangerous because it may bring the plane down within striking distance of the earth. Also, the speed attained during the stall or tailspin and the direction of flight of the airplane with respect to the air, create forces not contemplated in the structural design of airplanes and may cause important structural members of the airplane to fail. Further, during stalled and spinning conditions of an airplane, the pilot has very little control over the flight of the airplane. He cannot increase the lift of the wings by increasing its angle of attack as this increase further decreases the lift coefficient and exaggerates the stalled condition. This means that as long as a stalled or tailspin condition exists, the pilot has virtually lost all control over the motion of the plane.

Prior attempts to prevent stalled or spinning conditions entailed the use of the air speed indicator of the airplane as a warning device. Airplanes are manufactured and designed so as to have a certain stalling speed which is assumed to be constant. This measurement, however, is not reliable as this stalling speed is not constant under all conditions. In fact, it varies in almost unlimited degree. For example, if a given airplane has a stalling speed of 40 miles per hour in straight and level unaccelerated flight at normal load conditions, the stalling speed of 40 miles an hour will not be maintained when any of these conditions are altered. If the airplane were to be loaded less than its maximum designed load for which this stalling speed was measured, the plane will stall at a lower speed. If the forces due to acceleration, such as are created in a steep turn, are brought into account, the stalling speed may be greatly increased. An airplane in a 90° vertical turn that is not losing altitude, will have a stalling speed of infinity. The following table gives the variation of the stalling speed under the above conditions at various degrees of bank in a turn:

| | Miles per hour |
|---|---|
| 0° | 40.0 |
| 45° | 47.5 |
| 60° | 56.5 |
| 70° | 68.4 |
| 80° | 96.0 |
| 85° | 136.0 |
| 90° | Infinity |

In the leveling off of an airplane, following a descending flight, the force of gravity has added to it the force of vertical acceleration. This, also, is another condition which would alter the stalling speed of an airplane. In the flying of an airplane in the presence of air currents (or pockets or bumps), the forces due to the acceleration of an airplane caused by these air currents, can increase the stalling speed of the airplane. All of these factors make the use of air speed as an indicator for the safety margin as related to the stalling point an unreliable method of indication. By means of the present device, and under any of the above conditions, the airplane will stall at an angle of attack which can be predetermined for any particular plane.

The present device may also be used to obtain two other valuable indications. First, where the bracket arm is set in line with the chord of the wing so as to indicate the position in which the wing is being used in its most efficient manner. Second, for any airplane, the angle of attack can be pre-determined before flight, the condition depending upon design and horsepower of the airplane, so that the maximum and most efficient rate of climb may be obtained.

Under conditions of emergency when it is desired to have the airplane glide the maximum forward distance with minimum loss of altitude such as in a forced landing due to motor failure, the present device can be used to obtain the angle of attack best suited for this condition.

Figure 7:
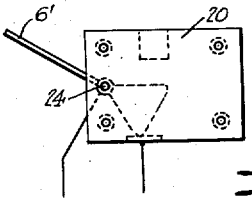
Fig. 7 is a view similar to Fig. 5 but showing the vane in the position it assumes when warning of an approaching stall.
Figure 8:
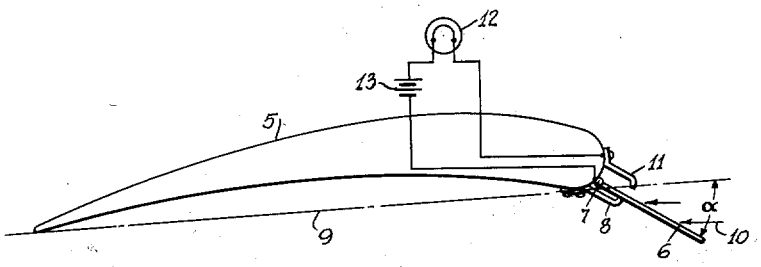
Fig. 8 is an edge view of an airplane wing incorporating another embodiment of the invention and shown in normal flight.

In Figs. 8 and 9, the device has been shown as pivoted directly to the leading edge of the wing. For convenience, a compact device may be completely assembled as illustrated in Figs. 5, 6 and 7 and ready to be mortised inside of the leading edge of a wing with the vane protruding sufficiently to be affected by the air mass as the local flow direction varies in flight.

To this end there is shown a frame comprised of two plates or side members 20 held in spaced apart condition by the spacer tubes 21 extending between the plates 20 at the four corners. Pins 22 extend through the spacers 21 and holes in the plates 20 and the ends thereof may be upset as at 23 to secure the frame firmly together. Instead of pins 22 riveted in position, bolts and nuts may be used.

Figure 5:
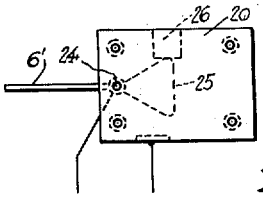
Fig. 5 is a side view of an embodiment of the invention with its vane in position it assumes in normal flight.
Figure 6:
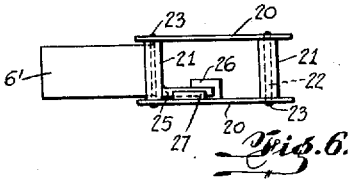
Fig. 6 is a plan view thereof.

A freely swinging vane 6' is pivoted between the plates 20 as at 24 and is provided with a counterweight 25 which is so shaped that when the vane is in neutral position as in Fig. 5, the counterweight will contact a stop 26 provided within the frame. When the flap 6' is raised the counterweight 25 will be brought into engagement with the contact 11' secured to a frame plate 20 and closes the electric circuit to light the warning lamp or sound the audible signal.

Having thus described my invention, what I claim as new and desire to secure by Letters Patent is:

1. The combination with an airfoil having a front separation point which shifts over the outer surface thereof with respect to a limit as the angle of attack varies, the approach to said limit substantially coinciding with the approach to stalling conditions, sensing means comprising a movable vane having at least one portion located within the range of influence of said shifting separation point and arranged to function on approach of said point to said stalling conditions, and indicating means controlled by said sensing means.

2. The combination with an aeronautical airfoil having a separation point which shifts between limits as the angle of attack varies, the approach to one of which limits coincides with approach to stalling conditions; a vane located within the range of influence of the shifting separation point and arranged to function on approach of said point to the stalling limit, and indicating means controlled by said vane.

*3. A unit adapted to be mounted on the leading edge of an airfoil for warning of an impending stall, said unit comprising a mounting means conforming to the contour of the leading edge of the airfoil and adapted to be mounted on said edge within the limits of fluctuation of the separation point, a vane, means to secure said vane to said mounting means for pivotal movement relative thereto within the range of influence of the shifting separation point so that said vane is*

*adapted to be operated on the approach of said point to stalling conditions, said pivotal securing means being behind the center of the vane whereby the vane is adapted to extend forwardly from the leading edge of the airfoil, a pair of spaced members between which the vane extends in order to limit to an arc rotation of said vane in either direction relative to said pivotal securing means, an electric switch carried by said mounting means and adapted to be connected to a source of energizing voltage, and electrically energizable indicating means having electric terminals adapted to be connected to said switch and to said source of energizing voltage whereby said vane will be operated and said indicating means energized from said source of voltage upon movement of the separation point as the angle of attack approaches stalling conditions of the airfoil.*

LEONARD GREENE.

REFERENCES CITED

The following references are of record in the file of this patent or the original patent.

UNITED STATES PATENTS

| Number | Name | Date |
|---|---|---|
| 1,760,740 | Branson | May 27, 1930 |
| 2,110,730 | Holland | Mar. 8, 1939 |
| 2,193,077 | Saxman | Mar. 12, 1940 |
| 2,287,497 | Rockfeller | June 23, 1942 |
| 2,328,384 | Lacoe | Aug. 31, 1943 |
| 2,337,753 | Lacoe | Dec. 28, 1943 |
| 2,373,089 | Allen | Apr. 10, 1945 |

FOREIGN PATENTS

| Number | Country | Date |
|---|---|---|
| 346,496 | Great Britain | Apr. 16, 1931 |

OTHER REFERENCES

Technical Notes No. 670, N. A. C. A., Stall Warning Indicator, Washington, Oct. 1938.

Report No. 563, of N. A. C. A., Calculated and Measured Pressure Distributions Over the Midspan Section of the N. A. C. A. 4412 Airfoil.